(12) United States Patent
Patel et al.

(10) Patent No.: US 6,905,539 B2
(45) Date of Patent: Jun. 14, 2005

(54) BLACK ERADICABLE INK, METHODS OF ERADICATION OF THE SAME, ERADICABLE INK KIT, AND ERADICATED INK COMPLEX

(75) Inventors: Sanjay Patel, Cypress, CA (US); David Godbout, Westmont, IL (US); Wing Sum Vincent Kwan, Chicago, IL (US)

(73) Assignee: Sanford L.P., Freeport, IL (US)

( * ) Notice: Subject to any disclaimer, the term of this patent is extended or adjusted under 35 U.S.C. 154(b) by 0 days.

(21) Appl. No.: 10/619,706

(22) Filed: Jul. 15, 2003

(65) Prior Publication Data

US 2005/0011404 A1 Jan. 20, 2005

(51) Int. Cl.$^7$ .......................... C09D 11/18; B05C 1/00
(52) U.S. Cl. ..................... 106/31.32; 106/31.64; 106/31.58; 106/31.86; 401/17; 401/21
(58) Field of Search ................. 106/31.32, 31.64, 106/31.58, 31.86; 401/17, 21

(56) References Cited

U.S. PATENT DOCUMENTS

| | | | |
|---|---|---|---|
| 2,029,152 A | 1/1936 | Bonkowski ................. 120/36 |
| 3,875,105 A | 4/1975 | Daugherty et al. ..... 260/33.2 R |
| 3,941,488 A | 3/1976 | Maxwell ..................... 401/17 |
| 3,945,837 A * | 3/1976 | Miyata et al. ............ 106/31.43 |
| 3,985,455 A | 10/1976 | Wahlberg ..................... 401/30 |
| 4,148,591 A | 4/1979 | Tomura ....................... 401/32 |
| 4,156,657 A | 5/1979 | Lin ..................... 252/188.3 R |
| 4,213,717 A | 7/1980 | Lin ............................. 401/18 |
| 4,227,930 A | 10/1980 | Lin ............................. 106/19 |
| 4,228,028 A | 10/1980 | Lin ..................... 252/188.3 R |
| 4,252,845 A | 2/1981 | Griffiths et al. ............. 427/273 |
| 4,349,639 A | 9/1982 | Muller ........................ 523/161 |
| 4,413,266 A | 11/1983 | Aviram et al. ................ 346/21 |
| 4,509,875 A | 4/1985 | Shintani ...................... 401/34 |
| 4,557,618 A | 12/1985 | Iwata et al. ................... 401/34 |
| 4,580,918 A | 4/1986 | Baker et al. .................. 401/29 |
| 4,738,725 A | 4/1988 | Daugherty et al. .... 106/308 M |
| 4,777,510 A | 10/1988 | Russel ......................... 355/7 |
| 4,808,227 A | 2/1989 | Yuasa et al. ................... 106/31 |
| 4,865,479 A | 9/1989 | Doll ............................ 401/17 |
| 4,971,628 A * | 11/1990 | Loftin ......................... 524/43 |
| 5,006,171 A | 4/1991 | Mecke et al. ................. 106/21 |
| 5,026,189 A | 6/1991 | Keil ............................ 401/29 |
| 5,033,895 A | 7/1991 | Aida .......................... 401/131 |
| 5,048,992 A * | 9/1991 | Loftin ........................ 401/209 |
| 5,139,572 A | 8/1992 | Kawashima ................. 106/21 |
| 5,215,956 A | 6/1993 | Kawashima ................ 503/201 |
| 5,232,494 A | 8/1993 | Miller ..................... 406/22 B |
| 5,256,191 A | 10/1993 | Thompson et al. ........... 106/19 |
| 5,326,288 A | 7/1994 | Lu et al. ..................... 439/851 |
| 5,326,388 A | 7/1994 | Miller et al. .............. 106/22 B |
| 5,338,123 A | 8/1994 | Obersteller et al. .......... 401/34 |
| 5,370,471 A | 12/1994 | Kageyama et al. ........... 401/52 |
| 5,378,752 A | 1/1995 | White et al. ................ 524/418 |
| 5,417,748 A | 5/1995 | Kawashima ............. 106/27 A |
| 5,460,647 A * | 10/1995 | Snedeker et al. ........... 523/161 |
| 5,464,470 A | 11/1995 | Brachman et al. ........ 106/22 A |
| 5,478,382 A | 12/1995 | Miller et al. .............. 106/22 B |
| 5,486,228 A | 1/1996 | Miller et al. .............. 106/22 B |
| 5,489,331 A | 2/1996 | Miller et al. .............. 106/22 B |
| 5,492,558 A | 2/1996 | Miller et al. .............. 106/22 B |
| 5,498,282 A | 3/1996 | Miller et al. .............. 106/22 B |
| 5,498,285 A | 3/1996 | Hooykaas ................... 106/486 |
| 5,499,881 A | 3/1996 | Chang ......................... 401/17 |
| 5,509,742 A | 4/1996 | Balzarini ..................... 401/17 |
| 5,593,459 A | 1/1997 | Gamblin ....................... 8/539 |
| 5,649,999 A | 7/1997 | Wang ...................... 106/31.32 |
| 5,762,077 A | 6/1998 | Griffiths .................... 132/74.5 |
| 5,785,746 A * | 7/1998 | Kito et al. ................ 106/31.86 |
| 5,872,162 A | 2/1999 | McHugh et al. ............ 523/161 |
| 5,877,234 A | 3/1999 | Xu et al. .................... 523/161 |
| 5,916,357 A | 6/1999 | Wang et al. ............. 106/31.23 |
| 5,964,931 A | 10/1999 | Korper .................... 106/31.93 |
| 5,977,211 A | 11/1999 | Koyama .................... 523/161 |
| 5,997,891 A | 12/1999 | Fuerst et al. ................ 424/401 |
| 6,037,391 A | 3/2000 | Iida ........................... 523/161 |
| 6,048,914 A | 4/2000 | Goto et al. ................. 523/161 |
| 6,051,629 A | 4/2000 | Ichikawa et al. ........... 523/161 |
| 6,124,377 A * | 9/2000 | Kaiser et al. ............... 523/161 |
| 6,149,721 A | 11/2000 | Wang et al. ............. 106/31.32 |
| 6,179,501 B1 | 1/2001 | Fulop .......................... 401/34 |
| 6,203,603 B1 | 3/2001 | Takayama et al. ....... 106/31.16 |
| 6,214,766 B1 | 4/2001 | Kurrle ........................ 503/201 |
| 6,221,432 B1 | 4/2001 | Wang et al. ................. 427/337 |
| 6,228,804 B1 | 5/2001 | Nakashima ................. 503/226 |
| 6,261,352 B1 * | 7/2001 | Asami ..................... 106/31.58 |
| 6,276,853 B1 | 8/2001 | Breidenbach et al. ......... 401/34 |
| 6,306,930 B1 | 10/2001 | Tsujio ........................ 523/161 |
| 6,357,943 B1 | 3/2002 | Kuang ........................ 401/17 |

(Continued)

FOREIGN PATENT DOCUMENTS

| | | |
|---|---|---|
| DE | 27 24 820 A1 | 12/1978 |
| DE | 199 03 248 A1 | 10/2000 |
| JP | 54-16235 | 6/1979 |
| JP | 60-190479 | 9/1985 |
| JP | 6049397 | 2/1994 |
| JP | 2001158196 | 6/2001 |
| JP | 2001-247807 | 9/2001 |
| JP | 2003-73602 | 3/2003 |

*Primary Examiner*—Mark L. Bell
*Assistant Examiner*—Veronica F. Faison
(74) *Attorney, Agent, or Firm*—Marshall, Gerstein & Borun LLP

(57) ABSTRACT

A shear-thinning eradicable ink including water, a dye selected from the group consisting of diarylmethane derivatives, triarylmethane derivatives, methine dyes, and a solvent, wherein the ink has a shear-thinning index in the range of about 0.35 to about 1.0; a kit including the ink and an eradicator solution; an ink complex including a colorless or substantially colorless dye selected from the group consisting of oxidized diarylmethane derivatives, oxidized triarylmethane derivatives, and oxidized methine dyes, and at least one or a gelling agent and thickener; and methods of using the ink as part of an eradicable ink system, are disclosed herein.

42 Claims, No Drawings

U.S. PATENT DOCUMENTS

| | | | |
|---|---|---|---|
| 6,406,204 B1 | 6/2002 | Omatsu et al. | 401/142 |
| 6,410,338 B1 | 6/2002 | Lippold et al. | 436/166 |
| 6,412,998 B1 | 7/2002 | Ham | 401/17 |
| 6,489,892 B2 | 12/2002 | Lawandy | 340/572.3 |
| 6,491,464 B1 | 12/2002 | Young | 401/35 |
| 6,518,356 B1 | 2/2003 | Friese et al. | 524/580 |
| 6,554,516 B1 | 4/2003 | Christopher | 401/31 |
| 6,613,135 B1 * | 9/2003 | Miyamoto et al. | 106/31.35 |
| 2001/0006610 A1 | 7/2001 | Miller et al. | 422/129 |
| 2002/0058296 A1 | 5/2002 | Miller et al. | 435/31 |
| 2002/0151084 A1 | 10/2002 | Lippold et al. | 436/163 |
| 2003/0082823 A1 | 5/2003 | Sumitani et al. | 436/136 |

* cited by examiner

BLACK ERADICABLE INK, METHODS OF ERADICATION OF THE SAME, ERADICABLE INK KIT, AND ERADICATED INK COMPLEX

BACKGROUND

1. Field of the Invention

The invention relates generally to inks that are capable of chemical eradication. More particularly, the invention relates to a gel or gel-like ink system that includes a dye that can be made substantially colorless upon the application of an oxidizing agent.

2. Brief Description of Related Technology

Eradicable ink systems generally include two components. One component is an aqueous ink that includes a dye typically a triarylmethane-that can be rendered substantially colorless when contacted with a substance such as a sulfite oxidizing agent or an amine. The second component is an aqueous eradicator fluid that includes a substance that can cause the dye to convert to a substantially colorless form. A user writes with the ink and, if correction is necessary, applies the eradicator fluid to the ink marking to decolorize the dye.

Aqueous inks used in eradicable ink systems have the disadvantage that they tend to leave a permanent mark when applied to fabrics such as clothes. In addition, aqueous ink instruments (e.g., pens and markers) used in an eradicable ink system can be prone to leakage and drying out.

Traditional non-gel inks that are used in ball-point pens typically include largely non-volatile organic solvents, such as benzyl alcohol, phenyl cellosolve, diethylene glycol monoethyl ether, dipropylene glycol, glycerin, and propylene glycol. Non-gelled ball-point pen inks tend to have a relatively high viscosity (e.g., greater than 10,000 centipose (cP)).

Triarylmethane dyes generally include a relatively hydrophilic counter-ion that renders the dye-insoluble in non-volatile organic solvents (e.g., Acid Blue 93 includes two sodium counterions). Thus, one of the problems associated with using an eradicable dye (e.g., a triarylmethane dye) in a typical ball-point ink formulation is the low solubility of triarylmethane dyes in the non-volatile organic solvents that are used in typical non-gelled ball-point ink systems.

SUMMARY

One aspect of the invention is an ink including water, a dye selected from the group consisting of diarylmethane derivatives, triarylmethane derivatives, methine dyes, and combinations of thereof, and a slow-evaporating solvent, wherein the ink is a shear-thinning ink.

Another aspect of the invention is a method of eradicating an ink, the method including the step of applying an eradicator solution to a shear-thinning eradicable ink mark.

Yet another aspect of the invention is a kit including a shear-thinning ink and an eradicator.

Yet another aspect of the invention is an ink complex, including a colorless or at least substantially colorless dye selected from the group consisting of oxidized diarylmethane derivatives, oxidized triarylmethane derivatives, oxidized methine dyes, and combinations thereof, and at least one of a gelling agent or a thickener.

Yet another aspect of the invention is a black eradicable ink, including a mixture of two or more eradicable dyes, wherein the mixture of eradicable dyes appears black in color.

Further aspects and advantages of the invention may become apparent to those skilled in the art from a review of the following detailed description, taken in conjunction with the appended claims. While the invention is susceptible of embodiments in various forms, the description hereinafter includes specific embodiments of the invention with the understanding that the disclosure is illustrative, and is not intended to limit the invention to the specific embodiments described herein.

DETAILED DESCRIPTION

The process of ink marking and eradication proceeds in two steps: the first is the marking of a substrate (e.g., paper) with an eradicable ink, and the second is the application of an eradication solution to the marking. A typical formulation for an eradicable ink includes a solvent (e.g., water) to dissolve a dye that is capable of such being eradicated (e.g., a triarylmethane dye). The eradication solution includes an eradicator that, by a chemical process, converts an otherwise colored dye into a substantially colorless compound or a color that matches that of the substrate (e.g., white for white paper). Such compounds include oxidizing agents, reducing agents, acid-base reactants, and chemicals that can sublime under the influence of heat. Without intending to be limited to any particular method of eradication, it is believed that for triarylmethane dyes, the active colored dye is able to reflect color in the visible range (between 380 nm to 780 nm) because of the conjugation of the aromatic rings in the molecule; however, once an oxidizing agent is applied to the triarylmethane dye, it destroys the conjugation and the dye becomes at least substantially colorless. This proposed process is shown below for Acid Violet 17:

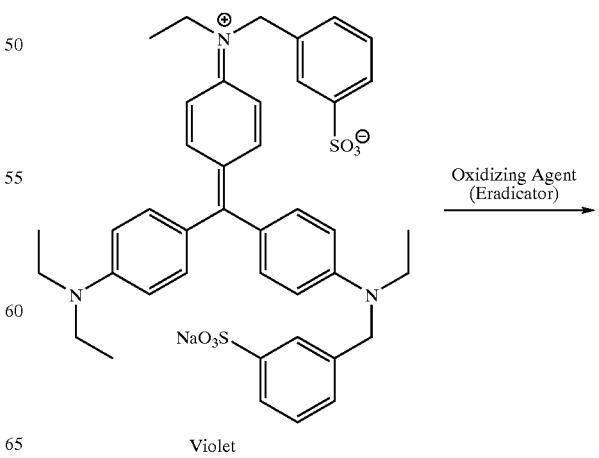

-continued

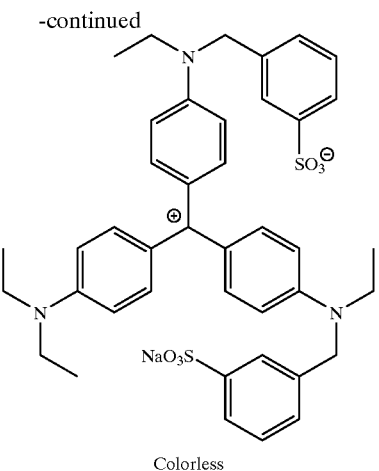

Colorless

The eradication solution preferably includes water or an organic solvent as the primary solvent, an eradicator such as, for example, a sulfite, bisulfite, or an amine (e.g., sodium glycinate) that can cause certain dyes to lose their colors (e.g, triarylmethane dyes) or to change color, and a film-forming polymer. A suitable eradicator solution for the inks disclosed herein is a commercially available eradicator solution that includes both a sulfite and an amine as active eradicating agents (e.g., oxidizers) (available from Sanford Reynolds of Valence, France).

A gel ink system, such as that described herein, is a shear-thinning ink, the viscosity of which is altered at the site of application of a shear force to the ink. As the viscosity of the ink is lowered upon the application of force, the properties of the ink change from a static gel state to a more fluid state, that is, more capable of movement.

One advantage of this reduction in viscosity upon the application of shear force is the ability to convert a gel ink that is too viscous to be capable of marking a substrate (e.g. paper) into an ink that has a viscosity low enough to mark a substrate. For example, a gel ink present in a ball-point pen is acted upon by a ball present at the writing tip of the pen. The rolling of the ball exerts a shear force on the gel ink in the vicinity of the ball, and the resulting reduction in viscosity of the ink causes the ink to flow from its high viscosity gel state to a lower viscosity and thereby to flow out of the pen. Another advantage of formulating an eradicable ink as a gel ink is that a gel ink is less prone to drying upon being exposed to the atmosphere.

The response that a fluid has in response to stress falls into two categories, those that exhibit Newtonian behavior (a Newtonian fluid) and those that exhibit non-Newtonian behavior (a non-Newtonian fluid). A Newtonian fluid is a fluid whose shear stresses are a linear function of the fluid shear rate. The best-known Newtonian fluid is water. The flow behavior of Newtonian fluids is simple to describe, as they follow Newton's law of viscosity given by equation Newton's law of viscosity is given by the equations $\tau=\mu(dv/dy)$, wherein $\tau$ is shear stress, $\mu$ is the viscosity of fluid, and $dv/dy$ is the shear rate (also known as the velocity gradient).

Ink compositions disclosed herein are aqueous, polymeric, and shear-thinning. The ink compositions are thickened liquids at rest and are non-Newtonian liquids that may have a rheological yield value and exhibit shear-thinning flow behavior or shear-thinning flow characteristics in use. Typically, they become thin, readily flowable liquids having a viscosity of about 100 cP or less at shear rates produced in writing such as, for example, with a ball-point pen. The ink compositions include at least one water dispersible, polymeric gelling agent or thickener uniformly dispersed in a carrier which is primarily water.

Quite surprisingly, it has been found that formulating an eradicable ink system including a dye such as a triarylmethane dye into formulation with shear-thinning properties (e.g., a gel or thickened formulation) avoids problems associated with a non-gelled aqueous eradicable ink system (e.g., excessive drying of the ink).

Non-Newtonian liquids are liquids that do not obey Newton's law of viscosity and, thus, the viscosity no longer holds as a constant value but depends on the magnitude of the applied shear rate. Hence, the viscosity of the fluid varies as a function of the shear rate applied to the fluid. The Cross model, shown below in formula (I), can be used to describe the behavior of a non-Newtonian fluid over a broad range of shear rates:

$$\frac{\eta - \eta_\infty}{\eta_0 - \eta_\infty} = \frac{1}{(1 + (K_1 \dot{\gamma})^{n_1})} \qquad (I)$$

wherein $\eta_0$, and $\eta_\infty$ are the Newtonian viscosities at low and high shear rate plateaus, respectively, $K_1$ is a constant with the dimension [s], and $n_1$ is a dimensionless constant. By solving this equation, the Cross shear-thinning index ($n_{cross}$) can be determined for a given non-Newtonian liquid.

While the Cross model describes the behavior of fluids across a wide range of shear rates, an alternative to the Cross model, the Power law equation ($\tau = K\gamma^n$), can also be used to describe the behavior a fluid. The Power law equation describes the behavior of fluid over a narrower range than the Cross model, but the Power law model will generally suffice to describe the behavior of most non-Newtonian liquids. The Power law equation allows for the calculation of the Power law shear-thinning index ($n_{power}$) by fitting shear stress ($\tau$) and shear rate values ($\gamma$) obtained from rheological measurements on a viscometer such as a CARRI-MED rheometer ($CSL^2$ 500), TA Instruments, New Castle, Del. (K and n are calculated constants). For the ink disclosed herein, either the Cross shear-thinning index ($n_{cross}$) or the Power law shear-thinning index ($n_{power}$) can be used to determine the behavior of an ink. The measurement of the shear-thinning index (n) of the ink disclosed herein is obtained by measurements of an aqueous solution of the ink at shear rates between about 30 $s^{-1}$ to about 300 $s^{-1}$. Shear stress values ($\gamma$) are measured from the curve on the CARRI-MED rheometer ($CSL^2$ 500) at a range of shear rates (typically 0.3, 10, 30, 100, 500, and 1200 $s_{-1}$), and the measured shear stress values are fitted to the shear rates using a curve-fitting program. There are variations on both the Cross and Power law models as well as other models to describe the behavior of a non-Newtonian liquid, and these variations and other models can also be used to determine the shear-thinning index of an ink disclosed herein.

The ink disclosed herein has shear-thinning index (n) of between about 0.35 to about 1.0, preferably between about 0.5 to about 0.9, and more preferably between about 0.6 to about 0.8.

Suitable polymeric shear-thinning materials provide inks which are thickened viscous liquids at rest or at low shear rates. For example, the ink disclosed herein has a viscosity of at least 50 cP and advantageously about 100 cP or higher at a shear rate of 30 $s^{-1}$. However, in response to shear rates produced by writing (approximately 0.1 $s^{-1}$ to 500 $s^{-1}$), the inks undergo shear-thinning and have a viscosity of about 100 cP or less. Accordingly, suitable gelling agents or thickeners are those which, in combination with the other components described herein, can provide an ink having a shear-thinning index (n) between about 0.35 to about 1.0, a viscosity of at least 50 cP at a shear rate of 30 sol, and a viscosity of about 100 cP or less at shear rates produced by writing. The ink disclosed can include one or more of a gelling agent and thickener.

Gelling agents for use in the ink can be selected from the group consisting of polysaccharides and derivatives thereof (e.g. METHOCEL™ cellulose available from Dow Chemical Co. of Midland, Mich.), starches and derivatives thereof (e.g., potato starch), hydrogels and derivatives thereof, silica gels and derivatives thereof, polyvinyl alcohol and derivatives thereof, and combinations of any of the foregoing. Preferably, the gelling agent is a polysaccharide and more preferably is xanthan gum. A gelling agent preferably is present in the ink in an amount in a range of about 0.1% to about 10% by weight based on the total weight of the composition, more preferably, about 0.1% to about 1% by weight.

Thickeners for use in the ink include glycols such as polyethylene glycol, polyvinylpyrrolidone (PVP), copolymers of PVP, polyvinylacetate (PVA), copolymers of PVA, clays, talc, and other materials that are capable of increasing the viscosity of a composition such as film-forming agents. To achieve an ink with the appropriate viscosity to achieve gel-like shear-thinning properties, a thickener is added in a sufficient quantity to increase the viscosity of an ink to between about 5,000 cP and about 10,000 cP. As the viscosity of the ink becomes greater than about 10,000 cP, the ink shear thinning effect is lessened to such a degree that the application of shear force tends to have an insubstantial effect on the viscosity of the ink. Put another way, an ink with a viscosity above about 10,000 cP tend to be less able to achieve the gel and gel-like property of shear thinning. The thickener preferably is selected from PVP and copolymers thereof, PVA and copolymers thereof, clays, talc, and combinations of the foregoing. More preferably, the thickener is selected from PVP, copolymers thereof, and combinations of the foregoing.

When the thickener or gelling agent used is a polymer (e.g., PVP), the thickener can be selected with a wide range of viscosities and molecular weights. For example, PVP is commercially available at various viscosities, and in a molecular weight range of 10,000 daltons to 1,300,000 daltons (Aldrich Chemical Co., Inc., Milwaukee, Wis.) for example. Thus, depending on the choice of viscosity and molecular weight of a polymer thickener, there can be a great deal of variation in the amount of thickener utilized in the ink. To achieve a viscosity at which the ink is shear-thinning, a thickener preferably reaches a viscosity between about 5,000 cP and about 10,000 cP. For example, when PVP with an average molecular weight of 130,000 daltons is used as a thickener, between about 3 wt. % and about 6 wt. % of PVP based on the total weight of the composition is sufficient to achieve a shear-thinning ink. A thickener used herein preferably is present in an amount in a range of about 3 wt. % to about 50 wt. % based on the total weight of the composition, more preferably about 5 wt. % to about 20 wt. %.

The inks disclosed herein are water-based inks (aqueous). Water preferably is present in an amount in a range of about 70% to about 95% by weight of the total weight of the composition, more preferably about 80% to about 90% by weight. The water acts to dissolve and/or suspend the components and also provides the added benefit of achieving washability of the ink from various materials (e.g., clothes).

The eradicable nature of the ink is derived from the ability to convert the dye (chromophore) from a colored compound to at least substantially colorless, or alternatively, to another color (e.g., the color of the paper used). As discussed above, this can be achieved with the combination of a dye that is sensitive to oxidation. Dyes which are capable of performing this change in color include diarylmethane derivative dyes, triarylmethane derivative dyes, and methine derivative dyes. Diaryl dyes for use with the inks disclosed herein include Auramine O (Chemical Index No. 41000), and Basic Yellow 2 (Chemnical Index No. 41000). In the colored state, the bi- and triarylmethane, and methine dyes often contain one or more cationic imine groups. The generic structure of a triarylmethane dye is shown below in formula (11):

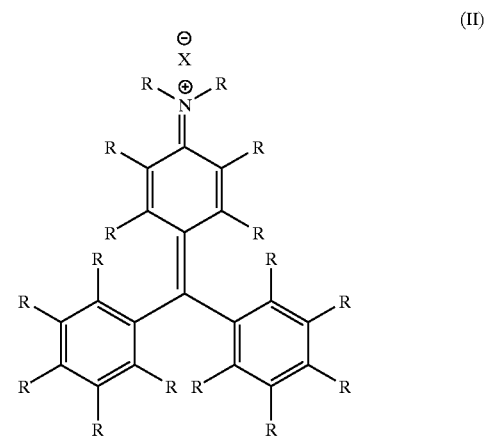

(II)

wherein each R group is the same or different and preferably is selected from C, to $C_{10}$ alkyl groups. A non-exhaustive list of triarylmethane dyes for use in inks disclosed herein are listed below in Table I.

TABLE I[1]

| Color Index Name | Color Index No. | Common/Commercial Name |
| --- | --- | --- |
| Acid Blue 22 | 42755 | Water Blue I |
| Acid Blue 93 | 42780 | Methyl Blue |
| Acid Fuchsin | 42685 | Acid Fuchsin |
| Acid Green | 42095 | Light Green Sf Yellowish |
| Acid Green 5 | 42095 | Light Green Sf Yellowish |
| Acid Magenta | 42685 | Acid Fuchsin |
| Acid Roseine | 42685 | Acid Fuchsin |
| Acid Rubin | 42685 | Acid Fuchsin |
| Acid Violet 17 | 42650 | Acid Violet 4BN |
| Acid Violet 19 | 42685 | Acid Fuchsin |
| Alizarol Cyanin R | 43820 | Eriochrome Cyanin R |
| Aluminon | 43810 | Triphenylmethane Chrome Violet Cg |
| Aniline Blue Ws | | Aniline Blue Ws |
| Basic Blue 8 | 42563 | Victoria Blue 4r |
| Basic Blue 15 | 44085 | Night Blue |
| Basic Blue 20 | 42585 | Methyl Green |
| Basic Blue 26 | 44045 | Victoria Blue B |
| Basic Fuchsin | | Basic Fuchsin |
| Basic Green 4 | 42000 | Malachite Green |
| Basic Red 9 | 42500 | Pararosanilin |
| Basic Red 14 | 48016 | Cationic Brilliant Red 5GN |
| Basic Violet 2 | 42520 | New Fuchsin |
| Basic Violet 3 | 42555 | Crystal Violet |
| Basic Violet 4 | 42600 | Ethyl Violet |
| Basic Violet 14 | 42510 | Rosanilin |
| Chrome Violet Cg | 43810 | Triphenylmethane Chrome Violet Cg |
| Chromoxane Cyanin R | 4382 | Eriochrome Cyanin R |

TABLE I[1]-continued

| Color Index Name | Color Index No. | Common/Commercial Name |
| --- | --- | --- |
| Cotton Blue | 42780 | Methyl Blue |
| Crystal Violet | 42555 | Crystal Violet |
| Dahlia | 42530 | Hoffman's Violet |
| Diamond Green B | 42000 | Malachite Green |
| Eriochrome Cyanin R | 43820 | Eriochrome Cyanin R |
| Ethyl Green | 42590 | Ethyl Green |
| Ethyl Violet | 42600 | Ethyl Violet |
| Fast Green Fcf | 42053 | Fast Green Fcf |
| Food 3 | 42053 | Fast Green Fcf |
| Gentian Violet | | Methyl Violet 2b |
| Helvetia Blue | 42780 | Methyl Blue |
| Hoffman's Violet | 42530 | Hoffman's Violet |
| Light Green | 42095 | Light Green Sf Yellowish |
| Lissamine Green Sf | 42095 | Light Green Sf Yellowish |
| Magenta 0 | 42500 | Pararosanilin |
| Magenta I | 42510 | Rosanilin |
| Magenta Ii | | Magenta Ii |
| Magenta Iii | 42520 | New Fuchsin |
| Malachite Green | 42000 | Malachite Green |
| Methyl Blue | 42780 | Methyl Blue |
| Methyl Green | 42585 | Methyl Green |
| Methyl Violet | 42535 | Methyl Violet 2b |
| Methyl Violet 2b | 42535 | Methyl Violet 2b |
| Methyl Violet 10b | 42555 | Crystal Violet |
| Mordant Blue 3 | 43820 | Eriochrome Cyanin R |
| Mordant Violet 39 | 43810 | Triphenylmethane Chrome Violet Cg |
| New Fuchsin | 4252 | New Fuchsin |
| Night Blue | 44085 | Night Blue |
| Pararosanilin | 42500 | Pararosanilin |
| Primula | 42530 | Hoffman's Violet |
| Rosanilin | 42510 | Rosanilin |
| Solochrome Cyanin R | 43820 | Eriochrome Cyanin R |
| Victoria Blue 4r | 42563 | Victoria Blue 4r |
| Victoria Blue B | 44045 | Victoria Blue B |
| Victoria Green B | 42000 | Malachite Green |
| Water Blue I | 42755 | Water Blue I |

[1]See, R.D. Lillie, Conn's Biological Stains (8th ed., 1969), Williams and Wilkins Company, Baltimore, Maryland; Susan Budavari (Ed.), The Merck Index, (12th ed., 1996), Merck & Co., Whitehouse Station, N.J; see also, P. A. Lewis (Ed.), Pigment Handbook Vol. I, Properties and Economics, sections I(D)f(1) and I(D)g, John Wiley & Sons, (2$^{nd}$ ed., 1988); H. Zollinger, Color Chemistry: Syntheses, Properties, and Applications of Organic Dyes And Pigments, Chapter 4, VCH Publishers (1987); D. R. Waring and G. Hallas (Eds.), The Chemistry and Application of Dyes, Chapter 2, Section IX, Plenum Press (1990); and M. Okawara, T. Kitao, T. Hirashima, and M. Matsuoka, Organic Colorants: A Handbook of Data of Selected Dyes for Electro-Optical Applications, Section VI, Elsevier (1988).

Another type of dye that can be used in an ink are the methine class of dyes. The methine dyes generally relate to dyes that contain a chromophore that consists of one or more of a methine group (—CH=C—), also called methylidyne or methine group. When the methine dye only contains one methine group the dye is sometimes referred to as a cyanine dye, with three methine groups the dye is sometime referred to as a carbocyanine dye, and with more than three methine groups the dye is often referred to as a polymethine dye. An example of a methine dye is Thiazole Orange, shown below:

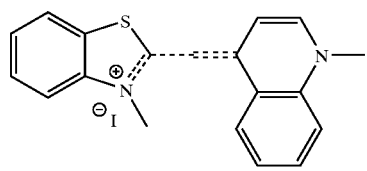

wherein the bonds that make up the methine groups are shown above as dashed lines. Other examples of methine dyes include Basic Red 15, Basic Yellow 11, and Basic Yellow 13. For a comprehensive listing of methine dyes, see F. M. Hamer, The Chemistry of Heterocyclic Compounds, A. Weissberger (Ed.), The Cyanine Dyes and Related Compounds, Wiley Interscience, New York (1964).

In spectroscopic terms, the color white is represented as having the property of reflecting light at of substantially all visible wavelengths without a substantial loss. If one considers the color white as a theoretical spectral starting point, once a wavelength of visible light is absorbed by the white material, that material is colored. For example, if a material is white and is made to absorb visible light at 470 nm, then that material would appear blue instead of white. Likewise, the color black, in spectroscopic terms, is represented as having the property of absorbing light at of substantially all visible wavelengths without a substantial loss.

When formulating an eradicable ink of a particular color, whether by the addition of one dye or a mixture of dyes, the rate of eradication of a dye (once applied to a substrate) is a consideration when selecting a dye. Without intending to be limited to a particular mechanism, it is believed that the rate of eradication of diarylmethane, triarylmethane, and methine dyes is proportional to the concentration of the dye in the ink. The ink described herein includes one or more dyes selected from the group consisting of diarylmethane dyes, triarylmethane dye, methine dyes, and combinations thereof. The dye preferably is present in an amount in a range of about 0.01% to about 10% by weight of the total weight of the composition, more preferably about 0.1% to about 6% by weight.

In selecting particular dyes for use in the ink, there are a number of dyes to choose from, and as a result, these dyes of different colors can be mixed to create an ink of almost any color. An eradicable ink disclosed herein can include two or more dyes that, when combined, provide an eradicable ink from a variety of colors. Preferably, the dyes are combined to provide a black eradicable ink. Two competing considerations when formulating a black eradicable ink are the rate of eradication and the intensity of the black color. An increase in the concentration of the dyes used to create the black color will increase the intensity of the color, however, as discussed above, an increase in the dye concentration also increases the amount of time needed to eradicate the dye. It has been found that for the ink disclosed herein the dye concentration in the range of about 0.1% to about 6% by weight based on the total weight of the composition is a preferred concentration to balance these considerations.

The color of the ink disclosed herein will primarily be determined by the dyes which cause the inks to reflect a particular wavelength of visible light. Mixing two dyes to form an ink of a particular color can be done with the use of two complementary colors, or combinations that contain all three primary colors (red, yellow, and blue). When two complementary colors are mixed, the resultant mixture is gray, with black being the completely saturated form of gray. The complement color of red is green, the complement color of orange is blue, and the complement color of yellow is violet. When using complementary colors, these pairs of complementary colors actually reflect all three primary colors. For example, when red and green dyes are mixed as complementary colors, it is the equivalent of mixing red with yellow and blue, because green is composed of a mixture of the two primary colors yellow and blue. In another example, the mixture of the two complementary colors yellow and violet is the equivalent of mixing yellow with red and blue, because violet is composed of two primary colors, red and blue.

In the ink described herein, the color black can be achieved by the mixing of dyes of either two complementary colors (e.g., green-red, or yellow-magenta) or by dyes with the combination of all three primary colors (red, yellow, and blue). In the ink described herein, a black ink is preferably formed from the combination of a green dye with a dye selected from the group consisting of a red dye, a violet dye, and combinations thereof. A preferred combination of red and green is the combination of Basic Red 14 and Basic Green 4.

When combining two or more colors to form an ink of a desired color, it is understood that the desired color (e.g., black), may be reached even though an undertone of another color (e.g., a bluish-black color) might be perceptible. For example, it is understood that an ink that is colored black can have a red or a blue undertone, and yet still be considered a black ink.

When mixing dyes that are capable of eradication (e.g., di-, triarylmethane and methine dyes) into an ink, it is extremely difficult to prepare a black eradicable ink. Quite surprisingly, it has been found that the combination of a green eradicable dye and a violet and/or a red dye is able to mix to form a black eradicable ink. One embodiment of an ink disclosed herein is a black eradicable ink, including a mixture of two or more dyes selected from the group consisting of diarylmethane derivatives, triarylmethane derivatives, methine dyes, and combinations thereof, wherein the mixture of dyes appears black in color.

The black eradicable inks described herein are considered black even though they may have a red or blue undertone. Control of undertone of the black color can be achieved by altering the weight ratio of the red and green dyes used to mix to form the black color, for example. An increase in the red dye concentration will lead to a red undertone to the black ink, and an increase in the concentration of the green dye (a mixture of the two primary colors yellow and blue) will lead to a blue undertone. When a black ink is formed from the combination of a red dye and a green dye, the preferred weight ratio of the red dye to the green dye is in the range of about 10:1 about 1:10, more preferably about 4:1 to about 1:4. When a black ink is formed from the combination of a violet dye and a green dye, the preferred weight ratio of the violet dye to the green dye is in the range of about 10:1 about 1:10, more preferably about 4:1 to about 1:4.

A black eradicable ink can be formed by the combination of a green dye and a dye selected from the group consisting of red dyes, violet dyes, and combinations thereof. Preferably, the dye is formed from the combination of a green dye in an amount in a range of about 25% to about 98% by weight with a red dye in an amount in a range of about 2% to about 75% by weight, and/or with a violet dye in an amount in a range of about 2% to about 75% by weight, each based on the total weight of the dye portion of the ink. More preferably, the dye is formed from the combination a green dye in an amount in the range of about 25% to about 98% with a red dye present in an amount in the range of about 1% to about 30%, and/or with a violet dye present in an amount in the range of about 1% to about 30%, each by weight based on the total weight of the dye portion of the ink.

A green dye preferably is selected from the group consisting of Acid Green, Acid Green 5, Basic Green 4, Diamond Green B, Ethyl Green, Fast Green Fcf, Food Green 3, Light Green, Lissamine Green Sf, Malachite Green, Methyl Green, Victoria Green B, and combinations thereof. Preferably, a red dye is selected from the group consisting of Basic Red 9, Basic Red 14, Basic Red 15, Basic Red 29, Basic Red 46, and combinations thereof. Preferably, a violet dye is selected from the group consisting of Acid Violet 17, Acid Violet 19, Basic Violet 2, Basic Violet 3, Basic Violet 4, Basic Violet 14, Chrome Violet Cg, Crystal Violet, Ethyl Violet, Gentian Violet, Hoffman's Violet, Methyl Violet, Methyl Violet 2b, Methyl Violet 10b, Mordant Violet 39, and combinations thereof. To form a yellow ink, a yellow dye is preferably selected from the group consisting of Basic Yellow 11, Basic Yellow 13, Basic Yellow 21, Basic Yellow 28, Basic Yellow 29, Basic Yellow 40, and combinations thereof.

When an aqueous ink is used in a delivery system such as a ball-point pen or other writing instrument, is it preferred to use one or more slow-evaporating solvents to control the amount of time it takes for the ink to dry once it is applied to a substrate (drying time). As compared to water, slow-evaporating solvents will evaporate faster than water, and when an aqueous ink includes a slow-evaporating solvent, the drying time will decrease. In order to optimize and exercise control over the drying time of an ink, it may be necessary to include more than one slow-evaporating solvent. A slow-evaporating solvent preferably is an organic solvent which is substantially soluble in water. Preferably, the slow-evaporating solvent is selected from the group consisting of glycols, ureas, fatty alcohols, dimethylformamide, dimethylsulfoxide, high molecular weight hydrocarbons, and combinations thereof. More preferably, the slow-evaporating solvent is polyethylene glycol. The slow-evaporating solvent preferably is present in the ink in a range of about 5% to about 30% by weight based on the total weight of the composition, more preferably about 10% to about 20% by weight, to achieve a drying time suitable for typical writing instruments and marking applications.

Glycols for use as a slow-evaporating solvent, include, but are not limited to, three broad categories of glycols: (a) glycol ethers (e.g., ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monoisopropyl ether, diethylene glycol monobutyl ether, diethylene glycol monophenyl ether, ethylene glycol dimethyl ether, ethylene glycol diethyl ether, diethylene glycol dimethyl ether, propylene glycol monomethyl ether); (b) glycol ether acetates such as ethylene glycol monomethyl ether acetate, ethylene glycol monoethyl ether acetate (e.g., ethylene glycol monobutyl ether acetate, ethylene glycol monophenyl ether acetate, diethylene glycol monomethyl ether acetate, diethylene glycol monoethyl ether acetate, diethylene glycol monobutyl ether acetate, diethylene glycol monophenyl ether acetate, diethylene glycol monoisopropyl ether acetate, ethylene glycol dimethyl ether acetate, ethylene glycol diethyl ether acetate, diethylene glycol dimethyl ether acetate, propylene glycol monomethyl ether acetate, and the like); and (c) glycol acetates (e.g., ethylene glycol monoacetate, ethylene glycol diacetate, and diethylene glycol diacetate). An ink composition can include other glycols not within one of these three categories, including glycols such as ethylene glycol, and ethoxylated glycols. A glycol may be used in the ink composition, preferably in an amount in the range of about 10% to about 20% by weight based on the total weight of the composition.

Fatty alcohols for use as a slow-evaporating solvent, include, but are not limited to, alcohols having eight through twenty carbon atoms, and fatty alcohols that are ethoxylated with one to three moles of ethylene oxide. Examples of fatty alcohols and ethoxylated fatty alcohols include, but are not limited to, behenyl alcohol, caprylic alcohol, cetyl alcohol, cetaryl alcohol, decyl alcohol, lauryl alcohol, isocetyl alcohol, myristyl alcohol, oleyl alcohol, stearyl alcohol, tallow alcohol, steareth-2, ceteth-1, cetearth-3, and laureth-2. Additional suitable fatty alcohols are listed in CTFA Cosmetic Ingredient Handbook, First ed., J. Nikotakis (Ed.), The Cosmetic, Toiletry and Fragrance Association, pages 28 and 45 (1988).

One embodiment of the ink includes water, a dye selected from the group consisting of diarylmethane derivatives, triarylmethane derivatives, methine dyes, and combinations thereof, and a slow-evaporating solvent, wherein the ink has a shear-thinning index in the range of about 0.35 to about 1.0.

Another aspect of the invention is a method of eradicating the ink including the step of applying an eradicator fluid to a marking made with an eradicable ink disclosed herein.

Another aspect of the invention is a kit that includes an eradicable ink described herein together with an eradicator fluid for use in system of marking a substrate and eradicating the marking. Each of the ink and the eradicator fluid can be disposed in a writing instrument (e.g., a pen) for ease of use or it may be supplied in another form such as a dauber, a bottled free ink solution, a stamp pad, and the like. The kit includes an eradicable ink as described herein, and an eradicator as described herein.

After an eradicable ink described herein is applied to a substrate, the solvents present in the ink (e.g., water and the slow-evaporating solvent) will largely evaporate. Likewise, the solvents present in the eradicator fluid (e.g. water) will substantially or completely evaporate once the eradicator has been applied to the ink, leaving the oxidizing agent along with the ink components. Thus, another aspect of the invention is a resulting colorless or substantially colorless complex of the ink described herein with an eradicator fluid after the solvents have substantially or completely evaporated. The ink complex includes a colorless or substantially colorless dye selected from the group consisting of an oxidized diarylmethane derivatives, oxidized triarylmethane derivatives, oxidized methine dye, and combinations thereof, and at least one of a gelling agent and a thickener.

Another embodiment of the ink includes about 80% to about 90% water by weight based on the total weight of the composition, a dye including about 50% to about 98% of Basic Green 4, about 1% to about 30% of Basic Red 14, and about 1% to about 30% of Acid Violet 17, each by weight based on the total weight of the dye in the composition, about 0.1% to about 5% xanthan gun by weight based on the total weight of the composition, and about 10% to about 20% polyethyleneglycol by weight based on the total weight of the composition.

An ink is a mixture of components that impart different properties to the ink. For example, a surfactant can be used to improve the absorption of an ink by a substrate (e.g., paper), and a film-forming agent can be used to improve the adhesion of the resulting mark to the substrate. Thus, the ink disclosed herein can include one or more additives selected from the group consisting of pH buffers, surfactants, biocides, anticorrosive agents, sequestering agents, and combinations thereof, in the amounts and proportions conventionally used in aqueous inks for various applications.

EXAMPLES

The following examples are provided to illustrate the invention but is not intended to limit the scope of the invention.

Example 1

A black eradicable ink was prepared with the ingredients identified below in the amounts shown:

| Component | Function | Amount (wt. %) |
|---|---|---|
| Water | Solvent | 86.31 |
| Propylene Glycol | Slow-evaporating Solvent | 2.15 |
| Glycerine | Slow-evaporating Solvent | 2.15 |
| PE E-400 | Slow-evaporating Solvent | 2.15 |
| Diethylene Glycol | Slow-evaporating Solvent | 2.15 |
| DEHYDRAN 1513 | Surfactant | 0.2 |
| PLURONIC P104 | Surfactant | 0.98 |
| PROXEL GXL | Biocide | 0.29 |
| KELZAN AR | Gelling Agent | 0.68 |
| Basic Red 14 | Dye | 0.98 |
| Basic Green 4 | Dye | 1.96 |

The propylene glycol (available from EM Science of Gibbstown, N.J.), glycerine, polyethylene glycol (PE E00, available from EM Science of Gibbstown, N.J.), diethylene glycol (available from ChemCentral of Chicago, Ill.), DEHYDRAN 1513 (available from Cognis of Cincinnati, Ohio), PLURONIC P104 (available from BASF, Mount Olive, N.J.), PROXEL GXL (available from Avecia, Inc. of Wilmington, Del.), and KELZAN AR (available from CP Kelco of Chicago, Ill.), were added at room temperature to the water and mixed until a homogenous, particulate-free solution was formed. The dyes were then added to this solution and the solution was mixed until the dyes were fully dissolved.

The resulting ink was then put into a PARKER 0.7 mm ball-point pen and applied to a sheet of white paper to determine the color of the ink once applied to a substrate. The ink was observed to be a black color with a blue undertone.

As described above, it is believed that the major contributing factor to the length of time it take to eradicate an ink is proportional to the weight percent of dye present in the ink. Thus, after the ink was applied to a white sheet of paper, the eradication time was tested with the commercially available eradicator solution available from Sanford Reynolds of Valence, France. The ink was eradicated (was not visible on the white paper) by completely covering the marking with eradicator solution and the marking was eradicated in approximately five seconds.

Example 2

| Component | Function | Amount (wt. %) |
|---|---|---|
| Water | Solvent | 84.7 |
| Propylene Glycol | Slow-evaporating Solvent | 9.4 |
| Polyvinylpyrrolidone | Thickener | 2.9 |
| Basic Red 14 | Dye | 0.8 |
| Basic Green 4 | Dye | 1.5 |
| Acid Violet 17 | Dye | 0.7 |

The propylene glycol (available from EM Science of Gibbstown, N.J.) and polyvinylpyrrolidone (K-90, available from ISP International of Wayne, N.J.) were added to the water and the resulting solution was mixed until the solution was homogeneous and particulate-free. The dyes where then sequentially added and the solution was mixed until there was no trace of undissolved dye in the solution.

The resulting ink was then put into a PARKER 0.7 mm ball-point pen and applied to a sheet of white paper to determine the color of the ink once applied to a substrate. The ink was observed to be a black color with a red undertone.

After the ink was applied to a white sheet of paper, the eradication time was tested with the commercially available eradicator solution (available from Sanford Reynolds of Valence, France). The ink was eradicated (was not visible on the white paper) by completely covering the marking with eradicator solution and the marking was eradicated in approximately five seconds.

The foregoing description is given for clearness of understanding only, and no unnecessary limitations should be understood therefrom, as modifications within the scope of the invention may be apparent to those having ordinary skill in the art. Throughout the specification, where compositions are described as including components or materials, it is contemplated that the compositions can also consist essentially of, or consist of, any combination of the recited components or materials, unless stated otherwise.

What is claimed is:

1. An ink comprising a mixture of (a) water, (b) at least two dyes, each of said dyes selected from the group consisting of diarylmethane derivatives, triarylmethane derivatives, methine dyes, and combinations thereof, and (c) a slow-evaporating solvent, wherein said mixture is black and at least one of said dyes is selected from the group consisting of green dyes, yellow dyes, and blue dyes, and said at least one dye is present in said mixture in a weight ratio to all other said dyes in said mixture in a range of about 10:1 to about 1:10.

2. The ink of claim 1, wherein said at least one dye is selected from the group consisting of Auramine O, Basic Yellow 2, Basic Yellow 11, Basic Yellow 13, Basic Yellow 21, Basic Yellow 28, Basic Yellow 29, Basic Yellow 40, Acid Blue 93, Acid Green 5, Basic Blue 8, Basic Blue 15, Basic Blue 20, Basic Blue 26, Basic Fuchsin, Basic Green 4, Ethyl Green, Fast Green Fcf, Food Green 3, Malachite Green, Methyl Blue, Methyl Green, Mordant Blue 3, and combinations thereof.

3. The ink of claim 1, wherein said at least one dye comprises Basic Green 4.

4. The ink of claim 1, wherein said dyes are present in an amount in a range of about 0.01% to about 10% by weight of the total weight of the composition.

5. The ink of claim 4, wherein said dyes are present in an mount in a range of about 0.1% to about 6% by weight of the total weight of the composition.

6. The ink of claim 1, wherein said mixture comprises a dye selected from the group consisting of red dyes, violet dyes, magenta dyes, and combinations thereof, and wherein said red, violet, and magenta dyes are selected from the group consisting of diarylmethane derivatives, triarylmethane derivatives, methine dyes and combinations thereof.

7. The ink of claim 6, wherein said mixture comprises a red dye selected from the group consisting of diarylmethane derivatives, triarylmethane derivatives, methine dyes and combinations thereof.

8. The ink of claim 7, wherein the weight ratio of said red dye to said at least one dye is in the range of about 4:1 to about 1:4.

9. The ink of claim 6, wherein said mixture comprises a violet dye selected from the group consisting of diarylmethane derivatives, triarylmethane derivatives, methine dyes, and combinations thereof.

10. The ink of claim 9, wherein the weight ratio of said violet dye to said at least one dye is in the range of about 4:1 to about 1.4.

11. The ink of claim 1, wherein said at least one dye comprises a green dye in an amount in a range of about 25% to about 98% by weight, and said mixture further comprises a red dye in an amount in a range of about 2% to about 75% by weight, each based on the total weight of the dye in the composition.

12. The ink of claim 1, wherein said at least one dye comprises a green dye in an amount in a range of about 25% to about 98% by weight, and said mixture further comprises a violet dye in an amount in a range of about 2% to about 75% by weight, each based on the total weight of the dye in the composition.

13. The ink of claim 6, wherein said red dye is selected from the group consisting of Basic Red 9, Basic Red 14, Basic Red 15, Basic Red 29, Basic Red 46, and combinations thereof; and said violet dye is selected from the group consisting of Acid Violet 17, Acid Violet 19, Basic Violet 2, Basic Violet 3, Basic Violet 4, Basic Violet 14, Crystal Violet, Ethyl Violet, Methyl Violet, Methyl Violet 2b, Methyl Violet 10b, Mordant Violet 39, and combinations thereof.

14. The ink of claim 1, further comprising a gelling agent selected from the group consisting of polysaccharides and derivatives thereof, starches and derivatives thereof, hydrogels and derivatives thereof, silica gels and derivatives thereof, polyvinyl alcohol and derivatives thereof, and combinations of the foregoing.

15. The ink of claim 14, wherein said gelling agent comprises xanthan gurn.

16. The ink of claim 14, wherein said gelling agent is present in an amount in a range of about 0.1% to about 10% by weight based on the total weight of the composition.

17. The ink of claim 1, further comprising a thickener selected from the group consisting of polyvinylpyrrolidone and copolymers thereof, polyvinylacetate and copolymers thereof, clays, talc, and combinations of the foregoing.

18. The ink of claim 17, wherein said thickener comprises polyvinylpyrrolidone.

19. The ink of claim 1, wherein said solvent is selected from the group consisting of glycols, ureas, fatty alcohols, dimethylformamide, dimethylsulfoide, high molecular weight hydrocarbons, and combinations thereof.

20. The ink of claim 19, wherein said solvent comprises polyethylene glycol.

21. The ink of claim 1, wherein said solvent is present in an amount in a range of about 5% to about 30% by weight based on the total weight of the composition.

22. The ink of claim 21, wherein said solvent is presented in an amount in a range of about 10% to about 20% by weight based on the total weight of the composition.

23. The ink of claim 1, further comprising an additive selected from the group consisting of pH, buffers, surfactants, biocides, anticorrosive agents, sequestering agents, and combinations thereof.

24. A method of eradicating an ink, comprising the steps of applying an ink of claim 1 to a substrate to make a marking, and applying an eradicator fluid to said marking.

25. The method of claim 24, comprising applying said ink to paper.

26. The method of claim 24, wherein said eradicator fluid comprises an eradicator selected from the group consisting of a sulfite, a bisulfite, and combinations thereof.

27. An eradicable ink kit, comprising an ink of claim 1 and an eradicator fluid.

28. The kit of claim 27, wherein said eradicator fluid-comprises an eradicator selected from the group consisting of a sulfite, a bisulfite, and combinations thereof.

29. The kit of claim 27, wherein said ink is disposed in a writing instrument.

30. The kit of claim 29, wherein said writing instrument is a ball-point pen.

31. An eradicated ink complex, comprising at least two colorless or substantially colorless dye selected from the group consisting of eradicated diarylmethane derivatives, eradicated triarylmethane derivatives, eradicated methine dyes, and combinations thereof, wherein when said dyes are in the non-eradicated state in an aqueous mixture said mixture is black and at least one of said dyes is selected from the group consisting of green dyes, yellow dyes, and blue dyes, said at least one dye present in a weight ratio to all other said dyes in a range of about 10:1 to about 1:10.

32. A black eradicable gel ink, comprising a mixture of about 80% to about 90% water by weight based on the total weight of the composition;

a dye comprising
        about 50% to about 98% of Basic Green 4,
        about 1% to about 30% of Basic Red 14, and
        about 1% to about 30 % of Acid Violet 17, each by weiught based on the total weight of the dye in the composition;

about 0.1% to about 5 % xanthan gum by weight baed on the total weight of the composition; and about 10% to about 20% polyethyleneglycol by weight based on the total weight of the composition.

33. The ink of claim 32, wherein said dye is present in an amount in a range of about 0.1% to about 6% by weight of the total weight of the composition.

34. The method of claim 24, wherein said eradicator fluid comprises a reducing agent.

35. The method of claim 24, wherein said eradicator fluid comprises an alkaline compound.

36. The kit of claim 27, wherein said eradicator fluid comprises a reducing agent.

37. The kit of claim 27, wherein said eradicator fluid comprises an alkaline compound.

38. The ink of claim 1, wherein said mixture has a shear-thinning index in a range of about 0.35 to about 1.0.

39. The complex of claim 31, further comprising at least one of a gelling agent and a thickener.

40. The ink of claim 38, wherein said mixture has a shear-thinning index in a range of about 0.5 to about 0.9.

41. The ink of claim 40, wherein said mixture has a shear-thinning index in a range of about 0.6 to about 0.8.

42. The complex of claim 39, wherein said gelling agent is a polysaccharide.

\* \* \* \* \*

UNITED STATES PATENT AND TRADEMARK OFFICE
CERTIFICATE OF CORRECTION

PATENT NO. : 6,905,539 B2
DATED : June 14, 2005
INVENTOR(S) : Patel et al.

It is certified that error appears in the above-identified patent and that said Letters Patent is hereby corrected as shown below:

Column 13,
Lines 36-37, delete "Basic Yellow 40, Acid Blue 93" and insert -- Basic Yellow 40, Acid Blue 22, Acid Blue 93 --.
Line 48, delete "mount" and insert -- amount --.
Lines 55-56, delete "methane derivatives, methine dyes and combinations thereof." and insert -- methane derivatives, methine dyes, and combinations thereof. --.
Lines 59-60, delete "derivatives, triarylmethane derivatives, methine dyes and combinations thereof" and insert -- derivatives, triarylmethane derivatives, methine dyes, and combinations thereof --.

Column 14,
Line 32, delete "gurn" and insert -- gum --.
Line 44, delete "dimethylsulfoide" and insert -- dimethylsulfoxide --.
Line 55, delete "pH," and insert -- pH --.

Column 15,
Line 1, delete "fluid-" and insert -- fluid --.
Line 9, delete "dye" and insert -- dyes --.
Line 24, delete "30 %" and insert -- 30% --.
Line 25, delete "weiught" and insert -- weight --.

Column 16,
Line 1, delete "baed" and insert -- based --.

Signed and Sealed this

Twenty-second Day of November, 2005

JON W. DUDAS
*Director of the United States Patent and Trademark Office*